Patented Dec. 3, 1946

2,411,884

UNITED STATES PATENT OFFICE 2,411,884

PLASTICIZING RUBBER

Robert J. King, New Canaan, and George Watson Thielcke, Norwalk, Conn., assignors to King & Lang, Inc., South Norwalk, Conn., a corporation of Connecticut No Drawing. Application July 23, 1941, Serial No. 403,704

7 Claims. (Cl. 260—761)

This invention relates to the plasticizing of rubber and provides a new process of plasticizing rubber.

The new compounds used in practicing the invention are the reaction products produced by subjecting a thiophenol to the action of an aldehyde and a primary aromatic amine. When used in plasticizing rubber in accordance with the process of the invention the new compounds bring about a substantial decrease in the recovery values of the rubber. This results in substantial savings in the power consumed in the rubber milling operations. The lower recovery values are also reflected in less "clubbing up" of the rubber after sheeting off.

In preparing the new compounds of the invention the reaction conditions are advantageously controlled so that substantially no hydrogen sulfide is liberted. The products may be in the form of oily viscous materials or in the form of solids, depending upon the particular thiophenol, aldehyde, or primary aromatic amine used in their preparation.

The thiophenols used in producing the new compounds may be represented by the formula R—SH in which R represents an aryl radical such as phenyl, tolyl, xylyl, biphenyl, naphthyl, methyl naphthyl, or a higher aromatic nucleus. Among the thiophenols which may be used with particular advantage are thiophenol, xylyl mercaptan, thio-β-naphthol, etc.

The aldehyde may be an aliphatic aldehyde such as, for example, formaldehyde, butyraldehyde, hexaldehyde, etc., or an aromatic aldehyde such as, for example, benzaldehyde.

Among the primary aromatic amines which may be used with advantage are aniline, o-toluidine, p-toluidine, p-xylidine, p-anisidine, p-chloro-aniline, and β-naphthylamine.

Instead of subjecting the thiophenol to the action of an aldehyde and a primary aromatic amine, the reaction products may be produced by treating the thiophenol with an aldehyde-primary aromatic amine reaction product (Schiff's base). Thus instead of reacting the thiophenol with formaldehyde and aniline the thiophenol may be reacted with methylene-aniline. In a similar manner such aldehyde-amines as butyraldehyde-aniline, hexaldehyde-aniline, or benzalaniline, etc. may be used in preparing the new compounds. In view of the foregoing where reference is made in the claims to products prepared by treating a thiophenol with an aldehyde and a primary aromatic amine, it is intended to include products prepared by treating a thiophenol with an aldehyde-primary aromatic amine reaction product.

The method of preparing the new compounds will be illustrated by the following examples, but the invention is not limited thereto:

EXAMPLE 1

*Xylyl mercaptan-aniline-formaldehyde reaction product*

About 9 parts of xylyl mercaptan and 6.1 parts of aniline are dissolved in about 40 parts by weight of isopropyl alcohol. About 5.2 parts of formaldehyde solution (approximately 35%) are then added. On standing for a short time a viscous liquid separated from the alcohol. On warming the solution it re-dissolved. The liquid was recovered by evaporation of the solvent on a steam bath.

EXAMPLE 2

*Thiophenol-formaldehydeaniline reaction product*

One mole of thiophenol was heated at about 95 to 100° C. for approximately one-half hour with one mole of formaldehydeaniline. During this heating period the formaldehydeaniline gradually dissolved in the thiophenol until there was no solid residue. The reaction product was a viscous oil which could not be crystallized but which distilled at approximately 95–140° C. at 2 mm. pressure.

EXAMPLE 3

*β-thionaphthol-benzalaniline reaction product*

About 4 parts of β-thionaphthol and 4.5 parts of benzalaniline were refluxed in about 72 parts by weight of isopropyl ether for about 24 hours. After evaporation to about one-fourth volume, 16 to 23 parts by weight of petroleum ether were added and the solution was cooled. Approximately 8 parts by weight of a white crystalline material were obtained. This was recrystallized from a mixture of petroluem ether and isopropyl ether and melted at about 69–70° C.

EXAMPLE 4

*Thionaphthol-formaldehydeaniline reaction product*

About 4 parts of thionaphthol and 3 parts of formaldehydeaniline were refluxed in about 55 parts by weight of isopropyl ether for 30 hours. At the end of this time there was not residue of formaldehydeaniline. On treating the reaction product in the same manner as in Example 3, no appreciable amount of solid material was obtained, even on cooling to −50° C. After removing the solvent under pressure and permitting the product to stand for several hours, about one-half of the product crystallized. Both the solid and liquid portions of the product are effective rubber plasticizers.

The exact chemical nature of the new compounds is not known to us. The products have only a slight odor and this odor as compared with the mercaptan odor characteristic of certain plasticizers is comparatively pleasant.

In plasticizing rubber compositions in accordance with the process of the invention a vulcanizable rubber is subjected to the action of a small quantity, e. g., about 0.15% by weight, of the new compounds.

The new compounds are effective as placticizers in the presence of fillers, such as zinc oxide. They have about the same effect on the flow values of rubber as thiophenols but they bring about lower recovery values than the thiophenols. Such improved recovery characteristics are of particular importance in sheeting or extruding factory goods, where the softness of the stock is not important (in fact, extreme softness may be a handicap), but the recovery, or increase in gauge of the rubber on standing, must be kept as low and as uniform as possible.

We claim:

1. The method of plasticizing vulcanizable rubber compositions which comprises mixing with the rubber a small amount of the product produced by subjecting a thiophenol to the action of an aldehyde and an aromatic amine.

2. The method of plasticizing vulcanizable rubber compositions which comprises mixing with the rubber a small amount of the product produced by subjecting a thiophenol to the action of an aliphatic aldehyde and an aromatic amine.

3. The method of plasticizing vulcanizable rubber compositions which comprises mixing with the rubber a small amount of the product produced by subjecting a thiophenol to the action of an aromatic aldehyde and an aromatic amine.

4. The method of plasticizing vulcanizable rubber compositions which comprises mixing with the rubber a small amount of the product produced by subjecting a thiophenol to the action of formaldehyde and aniline.

5. The method of plasticizing vulcanizable rubber compositions which comprises mixing with the rubber a small amount of the product produced by subjecting a thiophenol to the action of benzaldehyde and aniline.

6. The method of plasticizing vulcanizable rubber compositions which comprises mixing with the rubber a small amount of the product produced by subjecting a compound selected from the class consisting of thiophenol, thionaphthol and xylyl mercaptan to the action of formaldehyde and aniline.

7. The method of plasticizing vulcanizable rubber compositions which comprises mixing with the rubber a small amount of the product produced by subjecting a compound selected from the class consisting of thiophenol, thionaphthol and xylyl mercaptan to the action of benzaldehyde and aniline.

ROBERT J. KING.
GEORGE WATSON THIELCKE.